United States Patent [19]

Yamamoto et al.

[11] 3,846,386

[45] Nov. 5, 1974

[54] CROSS-LINKED COPOLYMER ACRYLONITRILE FIBERS OR FILMS

[75] Inventors: Akira Yamamoto; Kunio Nakaoji; Kunio Oohara; Zenjiro Momiyama; Heiichiro Murakami; Akira Tomita, all of Otsu, Japan

[73] Assignee: Toyo Boseki Kabushiki Kaisha

[22] Filed: July 24, 1972

[21] Appl. No.: 274,207

Related U.S. Application Data

[62] Division of Ser. No. 166,313, July 26, 1971, Pat. No. 3,759,849, which is a division of Ser. No. 753,515, Aug. 19, 1968, Pat. No. 3,626,049.

[30] Foreign Application Priority Data

Sept. 2, 1967  Japan.................................. 42-56502
Dec. 22, 1967  Japan.................................. 42-82509

[52] U.S. Cl................ 260/80.72, 260/8, 260/17.4, 260/79.7, 260/88.3, 264/182, 264/183, 264/184, 264/202, 264/205, 264/206, 264/210, 264/236
[51] Int. Cl. ........................................... C08f 19/00
[58] Field of Search........................ 260/80.72, 79.7

[56] References Cited
UNITED STATES PATENTS 2,687,400   8/1954   D'Alelio............................... 260/78
3,478,006   11/1969   Pilling............................ 260/85.5

*Primary Examiner*—Stanford M. Levin
*Attorney, Agent, or Firm*—Wenderoth, Lind & Ponack

[57] ABSTRACT

Cross-linked acrylic fibers or films which are of improved hot water-resistance and have a silky hand or feel, are obtained by (i) preparing an acidic solution of a copolymer obtained by copolymerizing in an acidic medium (a) a vinyl monomeric material consisting mainly of acrylonitrile and (b) a polymerizable unsaturated monomer having a halogenated s-triazinyl group or halogenated pyrimidinyl group in the presence of (c) a polymerizable unsaturated monomer having a group containing active hydrogen, a group capable of forming active hydrogen, a pyridyl group, a pyrazinyl group or quinolyl group, and/or (d) protein, and then (ii) extruding a very stable acidic solution of the resulting polymer into the form of fibers or films, and then heat-treating. The obtained fibers, for example, are useful in making woven or knitted fabrics of correspondingly superior properties.

1 Claim, 2 Drawing Figures

CROSS-LINKED COPOLYMER ACRYLONITRILE FIBERS OR FILMS

This application is a division of application Ser. No. 166,313, filed July 26, 1971, now U.S. Pat. No. 3,759,849, which in turn is a division of application Ser. No. 753,515, filed Aug. 19, 1968, now U.S. Pat. No. 3,626,049.

This invention relates to improved acrylic fibers and films high in the hot water-resistance, and also to processes for producing the same.

Generally fibers of acrylonitrile polymers have the disadvantage that they are much lower in strength and dimensional stability under heat, particularly in hot water, than any other synthetic fibers. The researches so far made to modify acrylic fibers have been directed mostly to the improvement of the dyeability and preventing of fibrillation by copolymerizing acrylonitrile with other monomer(s). Therefore, sucm modification has resulted in the reduction of the molecular chain orientation of the acrylic fibers and also in the deterioration in the hot water-resistance of the fibers.

There has recently been an attempt to improve the hot water-resistance of acrylic fibers by introducing a cross-linkage between the molecules of acrylic fibers. For example, in U.S. Pat. No. 3,399,007, there is disclosed a process wherein a cross-linkable monomer such as divinylbenzene is copolymerized with acrylonitrile. However, most of such cross-linkable comonomers have the disadvantage that the cross-linking reaction proceeds so quickly during the polymerizing step and up to the fiber formation step, that the polymer solution for forming shaped articles increases in viscosity or gels and the shaping operation becomes difficult.

An object of the present invention is to provide fibers and films of novel cross-linked acrylonitrile copolymers high in hot water-resistance and a process for producing the same.

A further object of the present invention is to provide improved protein-acrylonitrile graft copolymer fibers and films having a silky hand or feel and high in hot water-resistance.

A stil further object of the present invention is to provide a very stable solution for forming cross-linked acrylic fibers or films.

Other objects of the present invention will become clear from the following descriptions which will be made partly by referring to the accompanying drawings wherein:

These objects of the present invention may be accomplished by preparing an acidic solution of a copolymer obtained by copolymerizing in an acidic medium (a) a vinyl monomeric material consisting mainly of acrylonitrile and (b) a polymerizable unsaturated monomer having a halogenated s-triazinyl group or halogenated pyrimidimyl group in the presence of (c) a polymerizable unsaturated monomer having a group containing active hydrogen, a group capable of forming active hydrogen, a pyridyl group, a pyrazinyl group or quinoyl group, and/or (d) protein, and then extruding an acidic solution of the resulting polymer in the form of fibers or films, and then heat-treating.

The vinyl monomeric material consisting mainly of acrylonitrile in the present invention include acrylonitrile alone or a mixture of acrylonitrile and vinyl monomer(s) copolymerizable with acrylonitrile. Said vinyl monomers are, of course, other than those of the (b) and (c) monomers. In a monomeric mixture, acrylonitrile must be contained in an amount of at least 70 percent by weight.

Examples of vinyl monomers are acrylic acid and methacrylic, their esters such as methyl acrylate, methyl methacrylate and ethylacrylate, their amide derivatives such as acrylamide and methacrylamide, methacrylonitrile, allyl chloride, allyl sulfonic acid and its salts, ethylene sulfonic acid and its salts, itaconic acid and its ester derivatives, fumaronitrile, vinyl ethers such as methyl vinyl ether and ethyl vinyl ether, methyl vinyl ketone, styrene, α-substituted styrenes such as α-methyl styrene, nucleus-substituted styrenes such as o-, m- or p-methyl styrene, styrene sulfonic acid and its salts, vinyl esters such as vinyl chloride and vinyl acetate, vinyl lactams such as vinyl caprolactam and vinyl pyrrolidone and vinyl imidazole.

The halogenated s-triazinyl group or halogenated pyrimidinyl group in the polymerizable unsaturated monomer (hereinafter referred to as monomer A) having a halogenated s-triazinyl group or halogenated pyrimidinyl group is of the following structure:

halogenated s-triazinyl group halogenated pyrimidinyl group

[wherein each of $X_1$ and $X_2$ is a halogen, hydrogen, alkyl group, amino group, hydroxyl group, mercapto group, carboxyl group and wherein at least one of $X_1$ and $X_2$ must be a halogen].

Examples of preferable monomers A are of the following structural formulas:

2-allylamino-4,6-dichloro-s-triazine,

2-amino-4-allyoxy-6-chloro-s-triazine,

2-(p-vinylanilino)-4,6-dichloro-s-triazine, 2-acryloyloxyethylene amino-4,6-dichloro-s-triazine, 2-vinyloxyethylene amino-4,6-dichloro-s-triazine, and 2-(p-vinylphenoxy)-4,6-dichloro-s-triazine.

In the above formulas, R represents hydrogen or an alkyl group.

Further, those compounds in which the halogenated s-triazinyl group in the above mentioned compounds substituted with a halogenated pyrimidinyl group may also be used. Further, it is preferable that both $X_1$ and $X_2$ in the monomer A are halogens. Particularly, among the halogens, chlorine is preferable.

The most preferable examples of the monomer A are 2-allylamino-4,6-dichloro-s-triazine, 2-amino-4-allyloxy-6-chloro-s-triazine, 2-(p-vinylanilino)-4,6-dichloropyrimidine and 2-allylamino-4,6-dichloropyrimidine.

It is preferable that the content of the monomer A in the resulting acrylic copolymer is 0.03 to 10 percent by weight, and more preferably 0.3 to 5 percent by weight. In case the content of the monomer A component is lower than the above mentioned range, the hot water-resistance of the obtained fibers and films can not be improved to a desirable degree. On the contrary, in case it is higher than the above mentioned range, the elongation and softness properties in the dry state of the thus-obtained fibers and films are reduced.

Preferable examples of the polymerizable unsaturated monomer (hereinafter referred to as monomer B) having a group containing active hydrogen, a group capable of forming active hydrogen, a pyridyl group, a pyrazinyl group or a quinolyl group are as follows:

| | |
|---|---|
| Allylamine | $CH_2=CHCH_2NH_2$ |
| Methallylamine | $CH_2=C(CH_3)CH_2NH_2$ |
| Allylmethylamine | $CH_2=CHCH_2NHCH_3$ |
| Allylethylamine | $CH_2=CHCH_2NHCH_2CH_3$ |
| 1-(N-ethylamino)-3-butene | $CH_2=CHCH_2CH_2NHCH_2CH_3$ |
| β-Aminoethyl acrylate | $CH_2=CHCOOCH_2CH_2NH_2$ |
| β-Aminoethyl methacrylate | $CH_2=C(CH_3)COOCH_2CH_2NH_2$ |
| β-(N-methylamino)ethyl acrylate | $CH_2=CHCOOCH_2CH_2NHCH_3$ |
| β-(N-ethylamino)ethyl acrylate | $CH_2=CHCOOCH_2CH_2NHCH_2CH_3$ |
| β-(N-methylamino)ethyl methacrylate | $CH_2=C(CH_3)COOCH_2CH_2NHCH_3$ |
| β-(N-ethylamino)ethyl methacrylate | $CH_2=C(CH_3)COOCH_2CH_2NHCH_2CH_3$ |
| p-Aminostyrene |  |
| Allyl alcohol | $CH_2=CHCH_2OH$ |
| Methallyl alcohol | $CH_2=C(CH_3)CH_2OH$ |
| 3-butene-1-ol | $CH_2=CHCH_2CH_2OH$ |
| 3-butene-2-ol | $CH_2=CHCH(OH)CH_3$ |
| 4-pentene-2-ol | $CH_2=CHCH_2CH(OH)CH_3$ |
| β-Hydroxyethylacrylate | $CH_2=CHCOOCH_2CHOH$ |
| β-Hydroxyethyl methacrylate | $CH_2=C(CH_3)COOCH_2CH_2CH$ |
| Glycidyl methacrylate |  |
| Glycidyl acrylate |  |
| 2,3-dihydroxypropyl methacrylate | $CH_2=C(CH_3)COOCH_2CH(OH)CH_2OH$ |
| Ethylene glycol monovinyl ether | $CH_2=CHOCH_2CH_2OH$ |
| Diethylene glycol monovinyl ether | $CH_2=CHOCH_2CH_2OCH_2CH_2OH$ |

1-o-methacryloyl-D-glucose

3-o-methacryloyl-D-glucose

6-o-methacryloyl-D-glucose

1-o-methacryloyl-D-galactose

6-o-methacryloyl-D-galactose

2-N-methacryloyl glucosamine

1-acrylamido-1-dioxy-gluciton

1-o-p-vinylphenyl glucose p-hydroxystyrene

Vinyl pyridine 2-methyl-5-vinyl pyridine 2-vinyl quinoline and

Vinyl pyrazine

Of course, the monomers B are not limited to the above exemplified particular compounds but may be any of polymerizable unsaturated monomers having in the molecule a group containing active hydrogen such as an amino group, imino group or hydroxyl group, a group (e.g., epoxy group) capable of forming active hydrogen, a pyridyl group, a pyrazinyl group or a quinolyl group.

Particularly preferable among the monomers B are allylamine, allyl alcohol and vinyl pyridine.

It is preferable that the content of the monomer B in the resulting acrylic copolymer is 0.3 to 10 percent by weight, and more preferably 0.5 to 5 percent by weight. In case the content of the monomer B component is lower than the above mentioned range, the hot water-resistance of the obtained fibers and films can not be improved to any desired degree. On the contrary, in case it is higher than the above mentioned range, the elongation in the dry state of the obtained fibers and films is reduced and the materials lose their softness.

In regard to the protein to be used in the present invention, particularly preferable are natural proteins such as cow milk casein, yeast protein, gelatin, corn protein and soybean protein. In addition, there can be used modified proteins such as cyanoethylated protein and carbamylethylated protein or synthetic proteins.

It is preferable that the content of the protein in the resulting acrylic copolymer is 5 to 50 percent, more preferably 20-40 percent by weight. In case the content of the protein is lower than the above mentioned range, fibers high in the hot water-resistance and dyeability and having a silky hand and films high in the dyeability can not be obtained. On the contrary, in case it is higher than the above mentioned range, the toughness of the obtained fibers and films is reduced.

In carrying out the polymerization it is preferable to use an acidic medium of a pH of 6 or less, preferably a pH of 4 or less.

In case the polymerization is conducted in an acidic medium, substantially no cross-linking reaction proceeds during the polymerization reaction and therefore a polymer solution stable in viscosity is obtained. On the other hand, in case the polymerization is conducted in a neutral or alkaline medium, a cross-linking reaction quickly proceeds simultaneously with the polymerization reaction and the viscosity of the polymerization system increases so that the system gels and becomes unuseful as a solution for forming fibers and films in some cases. It is therefore recommended to conduct the polymerization in an acidic medium. Thus, in the present invention, it is most preferable to use such medium showing itself an acidity as, for example, a concentrated aqueous solution of zinc chloride. However, any medium which is inherently neutral or basic can be also used by adjusting the pH to be in the acidic range by adding an acid.

Preferable media which can be used in the polymerization of the present invention are, for example, a concentrated aqueous solution of zinc chloride, aqueous solution of nitric acid, an aqueous solution of nitrate-containing nitric acid, an aqueous solution of perchloric acid, an aqueous solution of a thiocyanate adjusted to be acidic, dimethyl sulfoxide adjusted to be acidic, ethylene carbonate or an aqueous solution of ethylene carbonate adjusted to be acidic, an aqueous solution of formic acid, a concentrated aqueous solution of urea adjusted to be acidic, an aqueous system adjusted to be acidic, and a mixture of any two or more of the above mentioned media.

Except above, such other polymerization conditions as the monomer concentration, catalyst, temperature and time may be those known, per se, in the art of polymerization or copolymerization, depending upon the particular medium. In this connection, reference may be made, for example, to U.S. Pat. No. 3,104,154.

Typical examples wherein the polymerization is conducted in a concentrated aqueous solution of zinc chloride and dimethyl sulfoxide shall be described as follows. It is preferable that the concentrated aqueous solution contains 40 percent by weight to the saturation of zinc chloride. If a second such substance as sodium chloride is to be added to the solution, the amount of such second substance is preferably in the range of 0 to 20 by weight.

The total concentration of the vinyl monomeric material, monomer A protein and/or monomer B to be added and dissolved into said concentrated aqueous solution of zinc chloride is preferably 3 to 40 percent by weight.

In case the monomer B contains an amino group, imino group, pyridyl group, pyrazinyl group or quinolyl group, it is preferable that said monomer B is added in the form of a hydrochloride.

For the polymerization catalyst may be used known radical polymerization initiators soluble in the concentrated aqueous solution of zinc chloride, such as azobisisobutylonitrile, ammonium persulfate, potassium persulfate or hydrogen peroxide. The catalyst may also be a redox catalyst system in which is simultaneously used such reducing agents as sodium sulfite, acidic sodium sulfite, sodium thiosulfate or a ferrous salt. Further, the polymerization may also be conducted under the irradiation of radioactive rays such as, for example, gamma rays of $Co^{60}$ or a light irradiation.

The polymerization temperature is 0° to 60°C. The polymerization time may be less than 40 hours.

In case dimethyl sulfoxide is used as a medium, it should be adjusted to be acidic by adding an organic acid or inorganic acid before initiating the polymerization. Preferably, the amount of the acid to be added is less than 10 percent by weight of the dimethyl sulfoxide. The vinyl monomeric material and protein and/or monomer B may be added and dissolved before the dimethyl sulfoxide is adjusted to be acidic but it is preferable, in preventing the gelling of the polymerization system, to add the monomer A after the dimethyl sulfoxide has been adjusted to be acidic. It is necessary that soybean protein which is hardly soluble in dimethyl sulfoxide at the normal temperature should be dissolved at an elevated temperature such as 100° to 150°C. It is preferable that the total concentration of the vinyl monomer material, monomer A and protein and/or monomer B be 3 to 40 percent by weight of the dimethyl sulfoxide. For the polymerizing catalyst may be used radical polymerization initiators soluble in dimethyl sulfoxide, such as azobisisobutylonitrile or ammonium persulfate. Further, it may be a redox polymerization in which a proper reducing agent is simultaneously used. Further, it is also possible to conduct the polymerization with such radioactive rays as, for example, gamma rays of $Co^{60}$ or a light-irradiation. The polymerization temperature is 0° to 100°C. and the polymerization time may be less than 50 hours.

The acrylic polymer solution obtained by the polymerization in a proper acidic medium, as mentioned above, can be used for forming fibers and films. It is also possible to pour the solution into a nonsolvent for said polymer so that the polymer is precipitated and separated, washed, dehydrated and then dissolved into a proper acidic solvent such as, for example, a concentrated aqueous solution of zinc chloride, dimethyl sulfoxide adjusted to be acidic, dimethyl formamide adjusted to be acidic or concentrated nitric acid. In the latter case, it is preferable to use washing water which has been adjusted to be acidic and at a comparatively low temperature, preferably below 30°C. In such case, the washed and dehydrated polymer can be stably stored as it is in a wet state for a considerably long time.

The acidic polymer solution is then extruded in the form of filament or film into an acidic or neutral coagulating bath or into a hot gaseous atmosphere such as hot air.

Fibers and films can be formed from the polymer solution by any well known method. For example, in the case of forming fibers by a wet-spinning method from a concentrated aqueous solution of zinc chloride of the acrylic polymer, the spinning solution is first filtered and deaerated and is then extruded through a spinnerette into an aqueous solution of 5 to 33 percent by weight of zinc chloride so as to coagulate the extruded filaments. The filaments are then waterwashed to remove zinc chloride and other materials deposited on them, are then stretched in a wet heated medium such as steam, hot water or a hot bath containing such salt as, for example, sodium sulfate and are dried and wound up.

In case an acidic dimethyl sulfoxide solution of the polymer is to be used as a spinning solution, there can be used a neutral dimethyl sulfoxide-water mixed solution or n-butanol for the coagulating bath. It is desirable to add an acid to such coagulating bath so as to be acidic.

In the case of forming a film, the acidic polymer solution is extruded in the form of a film into an acidic or neutral coagulating bath or into a hot atmosphere through a slit used of the spinnerette and the film is washed with water and thermally stretched.

The filaments or films extruded into the acidic or neutral coagulating bath or into a hot atmosphere contain an acidic substance having come from the original acidic polymer solution and/or the acidic coagulating bath. After the formation of the fibers (filaments) or films, cross-linking reaction proceeds when the acidic substance is removed e.g., by washing. The intermolecular cross-linking proceeds slowly at the room or normal temperature, but proceeds rapidly at a higher temperature such as 50°C. or higher, particularly at 80°C. or higher.

It is preferable to stretch the formed fibers or films in order to improve the mechanical properties. However, it is difficult to effect the stretching after the cross-linking has considerably proceeded. Therefore, in this invention, it is preferable that the stretching is conducted while the cross-linking has not yet proceeded or has proceeded only to a very small extent, and that the cross-linking is substantially proceeded during or after the stretching. Thus, for example, the formed filaments or films are stretched before the above mentioned acidic substance thereon is removed or while the said acidic substance is being removed. Alternatively, the acidic substance is first removed, and immediately thereafter or after travelling in an air of the normal temperature for a very short period of time, the filaments or films are stretched. In order to complete the inter-molecular cross-linking reaction, it is preferable to heat the filaments or films, during or after the stretching, to a temperature of from 50°C. up to the melting point. It is most preferable to first remove the acidic substance by washing, and immediately thereafter or after travelling in an air of the normal or room temperature for a short period of time, to conduct stretching in a heated steam, hot water or hot bath containing salt(s) such as sodium sulfate.

The reason why the acrylic fibers or films produced by the present invention show an excellent hot water-resistance is that an intermolecular cross-linkage is formed due to the reaction of the halogenated s-triazinyl group or halogenated pyrimidinyl group in the shaped article with the active hydrogen-containing group in the protein or/and the group containing active hydrogen, group capable of forming active hydrogen, pyridyl group, pyrazinyl group or quinolyl group in the monomer B, within the fibers or films. Further, in the present invention, the halogeno-s-triazinyl group or halogenopyrimidinyl group in the monomer A component shows no reactivity in an acidic medium so that the cross-linking reaction does not substantially proceed during the polymerizing reaction and up to the formation of the fibers or films. Therefore, the viscosity of the polymer solution is very stable for a long time.

Once such inter-molecular cross-linkage has been formed in the fibers and films, they do not dissolve again into the original solvent.

As compared with conventional acrylic fibers and films, the fibers and films produced by the present invention are higher in the strength when dry and wet, and are remarkably superior, particularly in such properties as the strength and elongation in hot water. Therefore, the fibers produced by the present invention, or their woven and knitted fabrics, and the films produced by the present invention are very high in the dimensional stability in a wet hot processing step such as dyeing. Particularly the protein-acrylonitrile graft-copolymer fibers produced by the present invention have a silky luster and a soft elegant peculiar hand.

The present invention will be explained in more detail by the following examples wherein all parts and percentages are by weight unless otherwise specified.

EXAMPLE 1

Fifty parts of cow milk protein were dissolved in 1,940 parts of an aqueous solution of 60 percent zinc chloride. To this solution were added 123.75 parts of acrylonitrile (hereinafter referred to as AN) and 1.25 parts (corresponding to 1.0 percent on the total amount of the monomers) of 2-allylamino-4,6-dichloro-s-triazine (referred to as AAT). While the solution was kept at a temperature of 10°C. and was being slowly stirred, 125 parts of an aqueous solution of 60 percent zinc chloride containing 1.0 percent ammonium persulfate and 250 parts of an aqueous solution of 60 percent zinc chloride containing 1.0 percent sodium sulfite were added to the solution. The polymerization was conducted under stirring at 10°C. for 2 hours. The viscosity of the resulting polymer solution was 250 poises at 30°C. The polymerization conversion rate was 48.8 percent (No. 1).

The same procedures were repeated except that AAT was added in an amount of 3.0 percent on the total amount of the monomers (No. 2) and that AAT was not added (No. 3).

Figure 1:
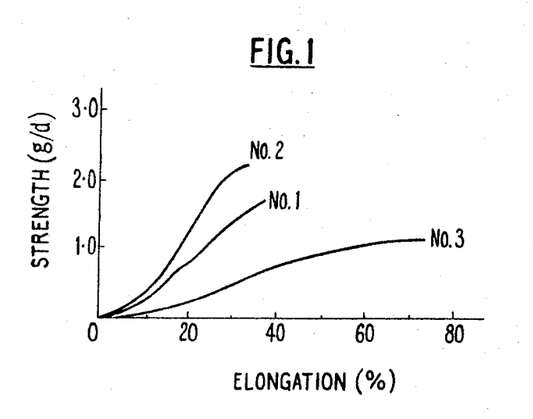
FIG. 1 is a graph showing the relation between the elongation and the strength of fibers of this invention as compared with conventional fibers.

Each of the polymer solutions thus obtained was filtered and deaerated, and then extruded through a spinnerette into an aqueous solution of 28 percent zinc chloride kept at $-2°$ to 0°C. The formed coagulated filaments were washed with water and stretched 15 times the length in steam at 120°C. to obtain fibers of a silky luster. The properties, dry and wet, of the fibers are shown in Table 1. Their load-elongation curves in hot water at 90°C. are shown in FIG. 1.

Table 1

| No. | Dry state | | | Wet state | | |
|---|---|---|---|---|---|---|
| | Strength (g./d.) | Elongation (%) | Initial modulus of elasticity (g./d.) | Strength (g./d.) | Elongation (%) | Initial modulus of elasticity (g./d.) |
| 1 | 4.41 | 14.8 | 61.8 | 3.80 | 15.5 | 43.8 |
| 2 | 4.59 | 14.0 | 72.5 | 4.00 | 15.0 | 47.9 |
| 3 | 4.10 | 15.0 | 51.3 | 3.40 | 16.2 | 37.3 |

As apparent from Table 1, as compared with the control fibers (No. 3), the fibers (Nos. 1 and 2) of the invention were higher in the strength and initial modulus of elasticity. As shown in FIG. 1, the fibers of this invention (Nos. 1 and 2) are remarkably superior particularly in strength and elongation in hot water.

EXAMPLE 2

Fifty parts of gelatin were dissolved in 2,000 parts of a 60 percent aqueous solution of zinc chloride. To this solution were added 115 parts of AN, 6 parts of methyl methacrylate and 3.75 parts of 2-(p-vinyl anilino)-4,6-dichloropyrimidine (referred to as VAP). Then the solution was irradiated with gamma rays of 100 curies of $Co^{60}$ at an intensity of $1.0 \times 10^5$ r./hr. at 30°C. for 3 hours to effect the polymerization. There was obtained a polymer solution (No. 5) with a polymerization conversion rate of 99.3 percent and a viscosity of 290 poises at 30°C.

The same procedure was repeated except that VAP was not added to obtain a polymer solution (No. 5).

Each of the polymer solutions was formed into filaments which were stretched under the same conditions as in Example 1 to obtain fibers having a silky luster. The properties of the fibers thus obtained are shown in Table 2.

Table 2

| No. | Dry state | | Wet state | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 4 | 4.14 | 16.3 | 3.54 | 17.0 | 1.71 | 34.9 |
| 5 | 3.84 | 16.9 | 3.25 | 18.0 | 0.99 | 73.6 |

As evident from Table 2, as compared with the control fibers (No. 5), the fibers (No. 4) of the present invention were higher in the strength both in dry and wet state and were remarkably superior particularly in the strength and elongation and in the dimensional stability in hot water.

EXAMPLE 3

Fifty parts of soybean protein were dissolved in 1,940 parts of an aqueous solution containing 55 percent zinc chloride and 5 percent sodium chloride. To this solution were added 115 parts of AN, 6.25 parts of acrylamide (referred to as AAM hereinafter) and 3.75 parts of 2-amino-4-allyloxy-6-chloro-s-triazine (hereinafter referred to as AAOT). While the solution was kpt at 8°C. and slowly stirred, 125 parts of an aqueous solution of 60 percent zinc chloride containing 1.0 percent ammonium persulfate and 250 parts of an aqueous solution of 60 percent zinc chloride containing 1.0 percent sodium sulfite were added to the solution and the polymerization was proceeded under stirring for 3 hours to obtain a polymer solution (No. 6) of a polymerization conversion rate of 96.5 prercent and a viscosity of 215 poises at 30°C.

The same procedure was repeated except that AAOT was not added to obtain a polymer solution (No. 7).

Each of these polymer solutions were extruded through a spinnerette into an aqueous coagulating bath containing 21 percent zinc chloride and 7 percent sodium chloride. The formed filaments were treated in the same manner as in Example 1 to obtain fibers having a silky luster. The properties of the fibers thus obtained are shown in Table 3.

ing to 1.0 percent on the total weight of the monomers) and 0.75 part of ammonium persulfate were added to the solution. The polymerization was conducted at 30°C. under a reduced pressure for 12 hours to obtain a polymer solution (No. 8) of a polymerization conversion rate of 94.8 percent.

The same procedures were repeated except that AAT was added in an amount of 3.0 percent on the total weight of the monomers (No. 9) and that, as a control, no AAT was added (No. 10).

Each of the three polymer solutions thus obtained was extruded through a spinnerette into an aqueous solution of 50 percent dimethyl sulfoxide of a pH adjusted to 3.51 with acetic acid. The formed filaments were well washed with water and were stretched 13 times the length in hot water at 90°C. to obtain white fibers of a silky luster. The properties of the fibers are shown in Table 4.

TABLE 4

| No. | Dry state | | | Wet state | | | In hot water at 90°C. | |
|---|---|---|---|---|---|---|---|---|
| | Strength (g./d.) | Elongation (%) | Initial modulus of elasticity (g./d.) | Strength (g./d.) | Elongation (%) | Initial modulus of elasticity (g./d.) | Strength (g./d.) | Elongation (%) |
| 8 | 3.92 | 15.6 | 52.5 | 3.40 | 17.2 | 39.9 | 1.59 | 50.3 |
| 9 | 4.33 | 14.9 | 70.0 | 3.58 | 15.0 | 45.2 | 2.13 | 42.9 |
| 10 | 3.80 | 16.9 | 45.6 | 3.23 | 18.8 | 33.4 | 1.18 | 80.9 |

As evident from Table 4, as compared with the control fibers (No. 10), the fibers (Nos. 8 and 9) of the invention were higher in the strength and initial modulus of elasticity both in dry and wet, and were remarkably superior particularly in strength and elongation in hot water at 90°C.

EXAMPLE 5

Twenty-two and half parts of dried gelatin were dispersed and heated at 120°C. to be dissolved in 277.5 parts of anhydrous dimethyl sulfoxide. A small amount of concentrated hydrochloric acid was added to the solution to adjust the pH to about 3.0. To this solution were added 47 parts of acrylonitrile, 1.5 parts of methyl methacrylate, 1.5 parts of 2(p-vinylanilino)-4,6-

Table 3

| No. | Dry state | | Wet state | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 6 | 3.84 | 15.9 | 3.34 | 16.0 | 1.39 | 38.0 |
| 7 | 3.76 | 16.0 | 2.97 | 18.7 | 0.90 | 72.8 |

As evident from Table 3, as compared with the control fibers (No. 7), the fibers (No. 6) of the invention were higher in the strength both in dry and wet, and were remarkably superior particularly in strength and elongation in hot water at 90°C.

EXAMPLE 4

Twenty-two and a half parts of dried cow milk protein were added and dissolved into 277.5 parts of anhydrous dimethyl sulfoxide. A small amount of acetic acid was added to the solution to adjust the pH to about 3.5. Then 49.5 parts of AN, 0.5 part of AAT (corresponddichloro-pyrimidine (hereinafter referred to as VAP). To this solution was further added 0.75 part of azobisisobutylonitrile. The polymerization was conducted at 50 C. under a reduced pressure for 24 hours. The polymerization conversion rate in this example was 93.4 percent (No. 11).

For comparison, the same procedure was repeated except that VAP was not added to obtain a control polymer solution (No. 12).

Each of these polymer solutions was formed into filaments under the same conditions as in Example 4 to obtain fibers having a silky luster. The properties of the fibers thus-obtained are shown in Table 5.

Table 5

| Nos. | Dry state | | Wet state | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 11 | 4.08 | 16.9 | 3.59 | 17.6 | 1.40 | 41.6 |
| 12 | 3.60 | 18.3 | 3.20 | 22.6 | 0.92 | 82.7 |

As evident from Table 5, as compared with the control fibers (No. 12), the fibers (No. 11) of the present invention were higher in the strength both in dry and wet state and were remarkably superior particularly in the strength and elongation in hot water at 90°C.

EXAMPLE 6

Twenty-two and a half parts of dried soybean protein were dispersed and heated at 120°C. to dissolve in 277.5 parts of anhydrous dimethyl sulfoxide. Then formic acid was added to the solution to adjust the pH to 3.0. To this solution were added 47 parts of acrylonitrile, 1.5 parts of vinyl acetate and 1.5 parts of 2-amino14-allyloxy-6-s-triazine (hereinafter referred to as AAOT). To this solution was further added 0.75 part of ammonium persulfate. The polymerization was conducted at 30°C. under a reduced pressure for 18 hours. The polymerization conversion rate in this example was 96.8 percent (No. 13).

For comparison, the same procedure was repeated except that AAOT was not added, to obtain a control polymer solution (No. 14).

Each of these two polymer solutions was formed into fibers under the same conditions as in Example 4 to obtain fibers of a silky luster. The properties of the fibers thus obtained are shown in Table 6.

Table 6

| No. | Dry state | | Wet state | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 13 | 4.00 | 16.2 | 3.39 | 18.0 | 1.43 | 43.8 |
| 14 | 3.68 | 16.9 | 3.10 | 20.8 | 1.01 | 78.2 |

As evident from Table 6, as compared with the control fibers (No. 14), the fibers (No. 13) of the present invention were higher in the strength, lower in the elongation and higher in the dimensional stability particularly in hot water.

EXAMPLE 7

By using AN, AAT, methyl acrylate (hereinafter referred to as MA) and allylamine (hereinafter referred to as AA) in various proportions, the polymerization was conducted at a total monomer concentration of 8 percent by weight in an aqueous solution of 60 percent zinc chloride (Nos. 15 and 16). In this example, AA was used in the form of a hydrochloride.

For comparision, the same procedure was repeated except that no AAT was used (No. 17) and that neither of AAT and AA were used (No. 18).

The monomer compositions were as in Table 7.

Table 7

| No. | AN | MA | AAT | AA | Total |
|---|---|---|---|---|---|
| 15 | 91.2 | 4.8 | 1 | 3 | 100 |
| 16 | 89.3 | 4.7 | 3 | 3 | 100 |
| 17 | 92.15 | 4.85 | 0 | 3 | 100 |
| 18 | 95 | 5 | 0 | 0 | 100 |

As evident from Table 7, the ratio of AN/MA in Nos. 1 to 4 was fixed at 95/5.

One hundred parts of the total monomers were added to 895 parts of an aqueous solution of 60 percent zinc chloride kept at 15°C. in the case of Nos. 15 to 17 or 20°C. in the case of No. 18. Then 135 parts of an aqueous solution of zinc chloride containing 1.67 percent soldium sulfite and 80 parts of an aqueous solution of 60 percent zinc chloride containing 1.25 percent ammonium persulfate were added to the solution under stirring. Further, after 30 minutes, 40 parts of the same aqueous solution of ammonium persulfate and zinc chloride were added thereto and the polymerization was conducted with stirring for 2 hours. The polymer solution was deaerated under a reduced pressure at 50°C. In any case the polymerization conversion rate was 99 to 100 percent. The viscosity at 30°C. was 300 poises in Nos. 15, 17 and 18 and 250 poises in No. 16.

Figure 2:
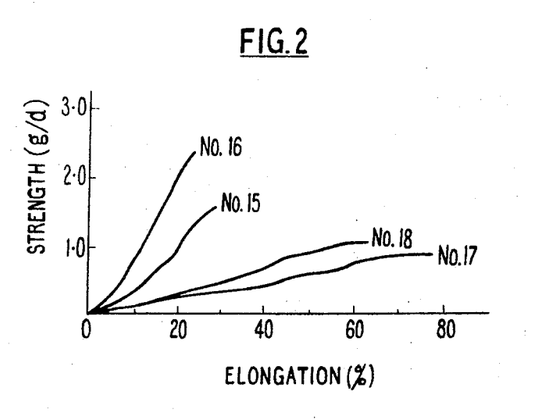
FIG. 2 is a graph similar to FIG. 1 but showing the same relation in respect of other fibers of this invention as compared with the conventional fibers.

Each of these polymer solutions was extruded through a spinnerette into an aqueous solution of 28 percent zinc chloride. The formed filaments were washed with water and then stretched 15 times the length in boiling water at 100°C. The properties of the fibers, in the dry and wet states, are shown in Table 8 and their load-elongation curves in hot water at 90°C. are shown in FIG. 2.

Table 8

| No. | Dry | | Wet | |
|---|---|---|---|---|
| | Strength (g./d.) | Elongation (%) | Strength (g./d.) | Elongation (%) |
| 15 | 3.98 | 17.2 | 3.49 | 21.0 |
| 16 | 4.22 | 15.8 | 4.15 | 17.0 |
| 17 | 3.13 | 25.2 | 2.50 | 28.9 |
| 18 | 3.70 | 18.3 | 3.33 | 22.3 |

Table 10

| No. | Dry Strength (g./d.) | Dry Elongation (%) | Wet Strength (g./d.) | Wet Elongation (%) | In hot water at 90°C. Strength (g./d.) | In hot water at 90°C. Elongation (%) |
|---|---|---|---|---|---|---|
| 19 | 3.98 | 16.4 | 3.73 | 18.0 | 1.53 | 33.2 |
| 20 | 4.27 | 15.3 | 4.13 | 16.9 | 2.12 | 25.8 |
| 21 | 3.65 | 19.0 | 2.91 | 20.3 | 1.04 | 66.4 |

As evident from Table 8, as compared with the AN-MA copolymer fibers (No. 18), the copolymer fibers (No. 18), the copolymer fibers (No. 17) in which AA was added but AATT was not added were lower in the strength and higher in the elongation. On the other hand, due to the inter-molecular cross-linkage at the time of the thermostretching, the copolymer fibers (Nos. 15 and 16) of the present invention obtained by using both AA and AAT higher in the strength, lower in the elongation and remarkably superior particularly in the strength and elongation in hot water at 90°C. as compared with the control fibers of No. 18.

Further, when the stretched filaments were dipped into an aqueous solution of 60 percent zinc chloride and an aqueous solution of 50 percent sodium thiocyanate, the fibers Nos. 17 and 18 18 were dissolved completely but the fibers Nos. 15 and 16 were not substantially dissolved.

As evident from Table 10, as compared with the control fibers (No. 21), the fibers (Nos. 19 and 20) of the present invention were higher in the strength and smaller in the elongation and were remarkably superior particularly in the strength and elongation in hot water at 90°C.

EXAMPLE 9

By using AN, MA, AAT and allyl alcohol (hereinafter referred to as AOH) as monomers in various proportions, the polymerization was conducted at a total monomer concentration of 8 percent by weight in an aqueous solution of 60 percent zinc chloride at 15°C. The polymerizing catalyst and other polymerizing conditions were the same as in Example 7 (but the polymerizing temperature in No. 24 was 20°C.). The monomer compositions, polymerization conversion rates (%) and the viscosities (poises at 30°C.) of the polymer solutions were as shown in Table 11.

Table 11

| No. | AN | MA | AAT | AOH | Total of monomers | Polymerization conversion rate | Viscosity of polymer solution |
|---|---|---|---|---|---|---|---|
| 22 | 89.3 | 4.7 | 3 | 3 | 100 | 98 | 262 |
| 23 | 92.15 | 4.85 | 0 | 3 | 100 | 98 | 308 |
| 24 | 95 | 5 | 0 | 0 | 100 | 99 | 320 |

EXAMPLE 8

With the monomers in various proportions as in Table 9, the polymerization was conducted in the same manner as in Example 7 in an aqueous solution of 60 percent zinc chloride at 15°C. The viscosity (centipoises at 30°C.) of the thus obtained polymer solution is also given in Table 9.

Each of the polymer solutions were deaerated and was then extruded through a spinnerette into an aqueous solution of 28 percent zinc chloride. The formed filaments were washed with water, stretched 10 times the length in a glycerin bath at 120°C. and were then dried. The properties of the fibers are shown in Table 12.

Table 12

| Nos. | Dry Strength (g./d.) | Dry Elongation (%) | Wet Strength (g.d.) | Wet Elongation (%) | In hot water at 90°C. Strength (g./d.) | In hot water at 90°C. Elongation (%) |
|---|---|---|---|---|---|---|
| 22 | 4.02 | 21.1 | 3.91 | 22.3 | 1.60 | 36 |
| 23 | 3.12 | 25.8 | 2.60 | 27.2 | 0.91 | 60 |
| 24 | 3.73 | 23.6 | 3.54 | 24.9 | 1.22 | 51 |

Table 9

| No. | AN | AAT | AA (AA hydrochloride) | Total of monomers | Viscosity of polymer solution |
|---|---|---|---|---|---|
| 19 | 96 | 1 | 3 (4.9) | 100 | 360 |
| 20 | 94 | 3 | 3 (4.9) | 100 | 310 |
| 21 | 87 | 0 | 3 (4.9) | 100 | 365 |

Each of the polymer solutions was deaerated and then extruded through a spinnerette into an aqueous solution of 28 percent zinc chloride. The formed coagulated filaments were washed with water and then stretched 12 times the length in boiling water and were then dried. The properties of the fibers thus obtained are shown in Table 10.

As evident from Table 12, as compared with the control fibers (Nos. 23 and 24), the fibers (No. 22) of the present invention were superior particularly in the strength and elongation in hot water at 90°C.

EXAMPLE 10

By using AN, MA, AAT and 4-vinyl pyridine (hereinafter referred to as VP) as monomers in various proportions, the polymerization was conducted at a total monomer concentration of 8 percent weight in an aqueous solution of 60 percent zinc chloride at a polymerizing temperature of 18°C. in the case of No. 25 and at 20°C. in the case of No. 26. The catalyst and other conditions were the same as in Example 7. The monomer compositions and the viscosities (poises at 30°C.) of the polymer solutions were as shown in Table 13.

Table 13

| No. | AN | MA | AAT | VP (VP HCl) | Total of monomers | Viscosity of polymer solution |
|---|---|---|---|---|---|---|
| 25 | 89.3 | 4.7 | 3 | 3 (4.07) | 100 | 290 |
| 26 | 95 | 5 | 0 | 0 | 100 | 303 |

Each of the polymer solutions was deaerated and was then extruded through a spinnerette into an aqueous solution of 28 percent zinc chloride. The formed filaments were washed with water, then stretched 10 times the length in a glycerin bath at 120°C. and were dried. The properties of the fibers thus obtained are shown in Table 14.

Table 14

| | Dry | | Wet | | In hot water at 90°C. | |
|---|---|---|---|---|---|---|
| No. | Strength (g./d.) | Elongation (%) | Strength (g./d.) | Elongation (%) | Strength (g./d.) | Elongation (%) |
| 25 | 4.09 | 20.2 | 3.93 | 21.8 | 1.73 | 34 |
| 26 | 3.70 | 23.3 | 3.51 | 25.0 | 1.19 | 50 |

As evident from Table 14, as compared with the control fibers (No. 26), the fibers (No. 25) of the present invention were superior particularly in strength and elongation in hot water at 90°C.

EXAMPLE 11

By using AN, MA, 2-allylamino-4,6-dichloropyrimidine (referred to as AAP) and AA as monomers in various proportions the polymerization was conducted at 15°C. for No. 27 and at 20°C. for No. 28 in an aqueous solution of 60 percent zinc chloride and otherwise under the same conditions as in Example 7. The monomer compositions and the viscosity (poises at 30°C.) of the obtained polymer solutions were as shown in Table 15.

Table 15

| No. | AN | MA | AAP | AA (AA HCl) | Total of Monomers | Viscosity of polymer solution |
|---|---|---|---|---|---|---|
| 27 | 89.3 | 4.7 | 3 | 3 (4.9) | 100 | 265 |
| 28 | 95 | 5 | 0 | 0 | 100 | 310 |

Each of the polymer solutions was spun and the filaments were stretched and dried in the same manner as in Example 7. The properties of the fibers are shown in Table 16.

Table 16

| | Dry | | Wet | | In hot water at 90°C. | |
|---|---|---|---|---|---|---|
| No. | Strength (g./d.) | Elongation (%) | Strength (g./d.) | Elongation (%) | Strength (g./d.) | Elongation (%) |
| 27 | 4.25 | 16.1 | 4.07 | 17.8 | 2.31 | 24.8 |
| 28 | 3.69 | 18.2 | 3.25 | 22.0 | 1.08 | 62.4 |

As evident from Table 16, as compared with the control fibers (No. 28), the fibers (No. 27) of the present invention were superior particularly in the strength and elongation in hot water at 90°C.

EXAMPLE 12

By using AN, AAM, AAOT and AA in various proportions the polymerization was conducted in the same manner as in Example 7 in an aqueous solution of 60 percent zinc chloride. The monomer compositions employed were as shown in Table 17. In the case of No. 29 (present invention) the polymerization conversion rate was 99.6 percent and the viscosity of the resulting polymer solution was 260 poises at 30°C.

Table 17

| No. | AN | AAM | AAOT | AA (AA HCl) | Total |
|---|---|---|---|---|---|
| 29 | 89.3 | 4.7 | 3 | 3 (4.9) | 100 |
| 30 | 92.15 | 4.85 | 0 | 3 (4.9) | 100 |
| 31 | 95 | 5 | 0 | 0 | 100 |

The properties of the fibers obtained from the polymer solutions in the same manner as in Example 9 are shown in Table 18.

Table 18

| No. | Dry Strength (g./d.) | Dry Elongation (%) | Wet Strength (g./d.) | Wet Elongation (%) | In hot water at 90°C. Strength (g./d.) | In hot water at 90°C. Elongation (%) |
|---|---|---|---|---|---|---|
| 29 | 3.81 | 23.0 | 3.63 | 24.5 | 1.52 | 40 |
| 30 | 2.75 | 27.5 | 2.31 | 28.0 | 1.00 | 65 |
| 31 | 3.60 | 24.2 | 3.32 | 25.6 | 1.15 | 54 |

As evident from Table 18, as compared with the control fibers (Nos. 30 and 31), the fibers (No. 29) of the present invention were superior particularly in the strength and elongation in hot water at 90°C.

EXAMPLE 13

By using various monomers as shown in Table 19, the polymerization was conducted in a non-uniform system at a total monomer concentration of 8.7 percent by weight in dexoygenated water adjusted to a pH of 1.5 with sulfuric acid.

Table 19

| No. | AN | MA | AAT | AA (AA HCl) | Total |
|---|---|---|---|---|---|
| 32 | 91.2 | 4.8 | 2 | 2 (3.3) | 100 |
| 33 | 95 | 5 | 0 | 0 | 100 |

Thus, 100 parts of the total monomers (AA was added in the form of a hydrochloride) were added into 1,040 parts of deoxygenated water of a pH of 1.5 kept at 35°C. for No. 32 and at 40°C. for No. 33. Then, 5.8 parts of an aqueous solution of 12 percent sodium sulfite and 5.8 parts of an aqueous solution of 8 percent ammonium persulfate were further added thereto with stirring in a nitrogen atmosphere and the polymerization was conducted for 4 hours. The formed polymer precipitate was separated, washed several times with 1N hydrochloric acid, and once with water and dehydrated with a centrifugal separator. The polymer (moisture content of 30 percent) was directly added into a solvent consisting of 55 percent nitric acid, 20 percent zinc nitrate and 25 percent water so as to produce a polymer concentration of 13 percent by weight. The mixture was stirred at 10°C. to dissolve the polymer. The resulting polymer solution was deaerated while being kept at 10°C. and was extruded through a spinnerette into an aqueous solution of 35 percent nitric acid at 10°C. The formed coagulated filaments were washed with water, stretched 7 times their length in boiling water and were dried. The properties of the obtained fibers are shown in Table 20.

Table 20

| No. | Dry Strength (g./d.) | Dry Elongation (%) | Wet Strength (g./d.) | Wet Elongation (%) | In the hot water at 90°C. Strength (g./d.) | In the hot water at 90°C. Elongation (%) |
|---|---|---|---|---|---|---|
| 32 | 2.91 | 25.4 | 2.68 | 27.0 | 1.43 | 45 |
| 33 | 2.63 | 27.7 | 2.32 | 29.1 | 1.04 | 66 |

As evident from Table 20, even in case the polymerization was conducted in a nonuniform system, as compared with the control fibers (No. 33), the fibers (No. 32) of the present invention were superior in the strength and elongation in hot water at 90°C.

EXAMPLE 14

With the same monomers as in Example 13, the polymerization was conducted at a total monomer concentration of about 20 percent by weight in dimethyl sulfoxide at a temperature of 40°C. adjusted to a pH of 1.2 with sulfuric acid.

Thus 100 parts of the total monomers were added to 395 parts of dimethyl sulfoxide of a pH of 1.2. Further, 0.3 part of azobisisobutylonitrile and 0.1 to 0.3 part of dodecyl mercaptan were added thereto and the polymerization was conducted with stirring at 45°C. for 40 hours in a nitrogen atmosphere. The resulting polymer solution was deaerated and was then extruded through a spinnerette into an aqueous solution of 82 percent dimethyl sulfoxide at 40°C. The formed coagulated filaments were stretched 7 times their length in a glycerin bath at 120°C., washed well with water, then passed as tensioned through a boiling water bath at 100°C. and finally dried. The properties of the obtained fibers are shown in Table 21.

Table 21

| No. | Dry | | Wet | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 34 | 2.83 | 25.2 | 2.41 | 26.1 | 1.37 | 49 |
| 35 | 2.58 | 28.8 | 2.10 | 30.0 | 0.98 | 78 | ployed are shown in Table 22 and the properties of the obtained fibers are shown in Table 23.

Table 22

| No. | AN | MA | AAT | AA (AA HCl) | Total |
|---|---|---|---|---|---|
| 36 | 91.2 | 4.8 | 2 | 2 (3.26) | 100 |
| 37 | 95 | 5 | 0 | 0 | 100 |

Table 23

| No. | Dry | | Wet | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 36 | 2.62 | 23.8 | 2.52 | 25.6 | 1.28 | 42.9 |
| 37 | 2.23 | 27.6 | 2.09 | 29.1 | 0.87 | 73.2 |

As evident from Table 21, as compared with the control fibers (No. 35), the fibers of the present invention were superior particularly in the strength and elongation in hot water at 90°C.

EXAMPLE 15

By using AN, MA, AAT and AA as monomers in various proportions and using azoisobutylonitrile as a catalyst, the polymerization was conducted at a total monomer concentration of 14.5 percent by weight in an aqueous solution of 94 percent ethylene carbonate in a nitrogen atmosphere at 50°C. for 20 hours. The resulting polymer solution was of a viscosity of 705 poises at 50°C. and a polymer conversion rate of 89.5 percent (No. 36).

For comparison, the same procedure was repeated except that AAT and AA were not added to obtain a polymer solution (No. 37) of a viscosity of 730 poises and a polymerization conversion rate of 88.0 percent.

Each of the polymer solutions was deaerated and was then extruded through a spinnerette into an aqueous coagulating bath at 30°C., adjusted to a pH of 1.8 with hydrochloric acid. The formed filaments were water-washed then stretched 7 times their length in boiling water and were dried. The monomer compositions em- As evident from Table 23, as compared with the control fibers (No. 37), the fibers (No. 36) of the present invention were remarkably superior particularly in the strength and elongation in hot water at 90°C.

EXAMPLE 16

Each of the polymers obtained in Example 13 was added and dissolved with stirring into dimethyl acetamide adjusted to a pH of 1.2 with sulfuric acid, so as to produce a polymer concentration of 20 percent. The polymer solution was filtered, deaerated and then extruded through a spinnerette into an aqueous solution of 55 percent dimethyl acetamide at 20°C. The formed filaments were washed with water, then stretched 6 times their length in boiling water at 95° to 100°C. and were dried. The properties of the obtained fibers are shown in Table 24.

Table 24

| No. | Dry | | Wet | | In hot water at 90°C. | |
|---|---|---|---|---|---|---|
| | Strength (g./d.) | Elongation (%) | Strength (g./d.) | Elongation (%) | Strength (g./d.) | Elongation (%) |
| 38 | 2.98 | 22.7 | 2.45 | 23.4 | 1.52 | 39.2 |
| 39 | 2.55 | 23.6 | 1.13 | 24.0 | 0.96 | 59.8 |

As evident from Table 24, as compared with the control fibers (No. 39), the fibers (No. 38) of the present invention were remarkably superior particularly in the strength and elongation in hot water at 90°C.

EXAMPLE 17

Four parts of soybean protein were dissolved in 180 parts of formic acid. Then 15.5 parts of AN, 0.5 part of AAT and 0.6 part of α,α'-azoisobutylonitrile were added thereto and the mixture was polymerized at 60°C. under a reduced pressure for 6 hours (No. 40). Then, the resulting reaction mixture was put into 500 parts of water and was dehydrated with a centrifugal separator to obtain 23.4 parts of a hydrous polymer of a moisture content of 30 percent. This hydrous polymer was added and dissolved with stirring into an aqueous solution of 60 percent zinc chloride to obtain a solution of a polymer concentration of 8 percent. The polymer solution was filtered and deaerated and was then extruded through a spinnerette into an aqueous solution of 28 percent zinc chloride at 0°C. The formed filaments were washed with water, then stretched 15 times their length in steam at 120°C. and were dried to obtain fibers having a silky luster.

The same procedure was repeated except that AAT was not added (No. 41).

The properties of the fibers thus obtained are shown in Table 25.

Table 25

| No. | Dry Strength (g./d.) | Dry Elongation (%) | Wet Strength (g./d.) | Wet Elongation (%) | In hot water at 90°C. Strength (g./d.) | In hot water at 90°C. Elongation |
|---|---|---|---|---|---|---|
| 40 | 3.98 | 14.8 | 3.41 | 16.3 | 1.98 | 33.8 |
| 41 | 3.40 | 15.0 | 3.00 | 17.0 | 1.18 | 67.3 |

As evident from Table 25, as compared with the control fibers (No. 41), the fibers (No. 40) of the present invention were remarkably superior particularly in their strength and elongation in hot water at 90°C.

EXAMPLE 18

Four parts of cow milk casein were dissolved in 190 parts of an aqueous solution of 50 percent urea adjusted to a pH of 6.01 with hydrochloric acid. To this solution were added 15.5 parts of AN, 0.5 part of AAT and 1 part of α,α'-azoisobutylonitrile. The mixture was polymerized at 60°C. for 6 hours (No. 42). Then the polymer precipitate was centrifugally separated, washed with water adjusted to a pH of 6 and was dehydrated to obtain 21.7 parts of a hydrous polymer of a water content of 28 percent. The hydrous polymer was processed in the same manner as in Example 17 to obtain fibers having a silky luster (No. 42).

For comparison, the same procedure was repeated except that AAT was not added (No. 43).

The properties of the fibers thus obtained are shown in Table 26.

Table 26

| No. | Dry Strength (g./d.) | Dry Elongation (%) | Wet Strength (g./d.) | Wet Elongation (%) | In hot water at 90°C. Strength (g./d.) | In hot water at 90°C. Elongation (%) |
|---|---|---|---|---|---|---|
| 42 | 3.81 | 15.0 | 3.33 | 16.7 | 1.70 | 34.4 |
| 43 | 3.41 | 15.7 | 2.99 | 18.0 | 1.13 | 69.5 |

As evident from Table 26, as compared with the control fibers (No. 43), the fibers (No. 42) of present invention were remarkably superior particularly in their strength and elongation in hot water at 90°C.

EXAMPLE 19

Five parts of corn protein were added to 80 parts of dimethyl formamide adjusted to a pH of 2.0 with phosphoric acid and were dissolved therein with stirring at the room temperature. Then, to this solution were added 14.85 parts of AN and 0.15 part of AAT and, as catalysts, 0.006 part of cupric nitrate and 0.225 part of potassium persulfate. The mixture was polymerized with stirring in a nitrogen gas current for 5 hours (No. 44). The polymerization conversion rate was 94.3 percent.

The same procedure was repeated except that AAT was added in an amount of 3.0 percent based on the total monomers (No. 45) and that no AAT was added (No. 46).

Each of the three polymer solutions was extruded through a spinnerette into a hot air spinning tube at 200 to 250°C. and the formed filaments were taken at a velocity of 110 m./min. The filaments were then stretched 5 times their length in hot water at 100°C. and were dried to obtain fibers having a silky luster. The properties of the fibers thus obtained are shown in Table 27.

Table 27

| No. | Dry Strength (g./d.) | Dry Elongation (%) | Wet Strength (g./d.) | Wet Elongation (%) | In hot water at 90°C. Strength (g./d.) | In hot water at 90°C. Elongation (%) |
|---|---|---|---|---|---|---|
| 44 | 2.99 | 17.1 | 2.45 | 18.0 | 1.33 | 40.2 |
| 45 | 3.41 | 16.9 | 2.93 | 17.1 | 1.67 | 38.8 |
| 46 | 2.53 | 21.8 | 2.11 | 23.3 | 0.81 | 69.4 |

As evident from Table 27, as compared with the control fibers (No. 46), the fibers (Nos. 44 and 45) of the present invention were higher in the strength when dry and wet and remarkably superior, particularly in strength and elongation in hot water at 90°C.

EXAMPLE 20

A polymer solution obtained in the same manner as in Example 1 was extruded through a slit 1.5 mm. wide and 1 m. long into an aqueous solution of 35 percent zinc chloride at 0°C. and was made to slide down, while being slowly coagulated at a velocity of 10 m./min., on a flat plate inclined by 15 degrees within coagulating bath. Then, the coagulated film was transferred to a water-washing bath, and was then stretched 5 times their length in one direction in hot water to obtain a stretched transparent film (No. 47).

In the same manner films were prepared from the polymer wherein the amount of AAT was 3.0 percent based on the total amount of the monomers (No. 48) and also from the polymer not containing AAT (NO. 49).

The physical properties in the stretching direction of the films are shown in Table 28.

Table 28

| No. | Dry | | Wet | | In hot water at 90°C. | | |
|---|---|---|---|---|---|---|---|
| | Tensile strength (kg./m²) | Elongation (%) | Tensile strength (kg./m²) | Elongation (%) | Tensile strength (kg./m²) | Elongation | Shrinkage |
| 47 | 3.18 | 22 | 2.68 | 24 | 0.9 | 40 | 4.2 |
| 48 | 3.33 | 19 | 3.00 | 23 | 1.3 | 33 | 1.1 |
| 49 | 2.72 | 24 | 2.46 | 26 | 0.4 | 99 | 8.9 |

As evident from Table 28, as compared with the control film (No. 49), the films of the present invention (Nos. 47 and 48) were remarkably superior particularly in the strength, elongation and shrinkage in hot water at 90°C.

EXAMPLE 21

Films were formed under the same conditions as in Example 20 except that polymer solutions obtained in the same manner as in Example 7 were used. The physical properties of the films in the stretching direction are shown in Table 29 wherein Nos. 50 to 53 correspond respectively to Nos. 15 to 18 in Table 7.

Table 29

| No. | Dry | | Wet | | In hot water at 90°C. | | |
|---|---|---|---|---|---|---|---|
| | Tensile strength (kg./m²) | Elongation (%) | Tensile strength (kg./m²) | Elongation (%) | Tensile strength (kg./m²) | Elongation (%) | Shrinkage (%) |
| 50 | 3.22 | 21.0 | 2.80 | 24.3 | 1.1 | 39.9 | 4.0 |
| 51 | 3.81 | 17.4 | 3.14 | 22.9 | 1.4 | 34.2 | 0.8 |
| 52 | 2.48 | 29.6 | 2.01 | 31.3 | 0.3 | 102.3 | 10.1 |
| 53 | 2.93 | 23.3 | 2.39 | 27.4 | 0.6 | 98.4 | 8.7 |

As evident from Table 29, as compared with the control films (Nos. 52 and 53), the films of the present invention (Nos. 50 and 51) were remarkably superior particularly in the strength, elongation and shrinkage in hot water at 90°C.

What is claimed is:

1. An acrylic fiber or film of a cross-linked copolymer consisting essentially of (a) a vinyl monomeric material consisting mainly of acrylonitrile, (b) 0.03 to 10 percent by weight, based on the weight of the copolymer, of a polymerizable unsaturated monomer having a group selected from the class consisting of halogenated S-triazinyl groups of the general formula:

and halogenated pyrimidinyl groups of the general formula:

wherein each of $X_1$ and $X_2$ is a halogen, hydrogen, alkyl group, amino group, hydroxyl group, mercapto group or carboxyl group, and wherein at least one of $X_1$ and $X_2$ must be a halogen, (c) 0.3–10 percent by weight, based on the weight of the copolymer, of a polymerizable unsaturated monomer component containing an active hydrogen group selected from the class consisting of amino, imino, hydroxyl, glycidyl, pyrazinyl and quinolyl groups, said cross-linking existing between the active hydrogen group of component (c) and the halogenated S-triazinyl group or halogenated pyrimidinyl group of component (b).

* * * * *